United States Patent
Mitsumoto et al.

(10) Patent No.: US 7,282,118 B2
(45) Date of Patent: Oct. 16, 2007

(54) METHOD FOR PRODUCTION OF EASILY POLYMERIZABLE SUBSTANCE AND PURIFICATION APPARATUS

(75) Inventors: Tetsuji Mitsumoto, Himeji (JP); Takeshi Nishimura, Himeji (JP); Sei Nakahara, Himeji (JP); Hidefumi Haramaki, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 520 days.

(21) Appl. No.: 09/828,093

(22) Filed: Apr. 6, 2001

(65) Prior Publication Data
US 2001/0030120 A1 Oct. 18, 2001

(30) Foreign Application Priority Data
Apr. 14, 2000 (JP) .............................. 2000-114305

(51) Int. Cl.
*B01D 3/32* (2006.01)
*C07C 51/42* (2006.01)

(52) U.S. Cl. .......................... 203/8; 203/100; 261/128; 261/114.1; 261/114.4; 562/600

(58) Field of Classification Search ................... 203/99, 203/100, 8; 202/158; 261/114.5, 94, 114.1, 261/114.4, 128; 562/600; 585/810
See application file for complete search history.

(56) References Cited

U.S. PATENT DOCUMENTS

| | | | |
|---|---|---|---|
| 3,393,133 A * | 7/1968 | Baird | 203/89 |
| 4,174,363 A * | 11/1979 | Bruckert | 261/114.5 |
| 4,304,738 A * | 12/1981 | Nutter | 261/94 |
| 4,398,595 A * | 8/1983 | Small | 165/109.1 |
| 5,164,125 A * | 11/1992 | Binkley et al. | 261/114.1 |
| 5,255,737 A * | 10/1993 | Gentry et al. | 165/159 |
| 6,113,079 A * | 9/2000 | Urbanski et al. | 261/114.5 |
| 6,214,174 B1 * | 4/2001 | Matsumoto et al. | 203/86 |
| 6,382,313 B2 * | 5/2002 | Mitsumoto et al. | 165/159 |
| 6,641,700 B1 * | 11/2003 | Matsumoto et al. | 202/158 |

FOREIGN PATENT DOCUMENTS

| | | |
|---|---|---|
| EP | 0 856 343 A1 | 1/1998 |
| JP | A010-212249 | 8/1998 |

* cited by examiner

*Primary Examiner*—Virginia Manoharan
(74) *Attorney, Agent, or Firm*—Mathews, Shepherd, McKay & Bruneau, P.A.

(57) ABSTRACT

This invention resides in providing a method for the prevention of possible polymerization of the easily polymerizable substance during the purification thereof by a column provided with (a) at least one tray directly fixed to a support ring with a bolt and a nut and/or (b) at least one tray fixed to a support ring with a vertical clamp or a distillation column provided in the lower part thereof with a splash collision plate.

10 Claims, 7 Drawing Sheets

METHOD FOR PRODUCTION OF EASILY POLYMERIZABLE SUBSTANCE AND PURIFICATION APPARATUS

BACKGROUND OF THE INVENTION

1. Field of the Invention

This invention relates to a method for the production of an easily polymerizable substance and a purification apparatus to be used therein. More specifically, it relates to a method for the purification of an easily polymerizable substance and a purification apparatus to be used therein and a method for the prevention of an easily polymerizable substance from yielding to polymerization in a distillation column and a purification apparatus to be used therein.

2. Description of the Related Art

Since easily polymerizable substances such as acrylic acid and methacrylic acid are liable to polymerize, they are purified in the presence of a polymerization inhibitor.

When such an easily polymerizable substance is distilled, for example, it stagnates in a liquid state on the inner surfaces of structural members of a distillation device and, as such, inevitably succumbs to polymerization. To avoid this phenomenon, this polymer has been separated by passing through a strainer the liquid withdrawn from the distillation device. Alternatively, the fact that stopping the operation of the distillation device and then artificially removing the polymer accumulated inside the device has been resorted.

As one measure to eliminate such a problem as mentioned above, JP-A-10-212,249 describes the idea of preventing an easily polymerizable organic compound from stagnating in a purification device by providing liquid passing openings to the tray supporting member or the packing supporting member of the device.

Figure 1:
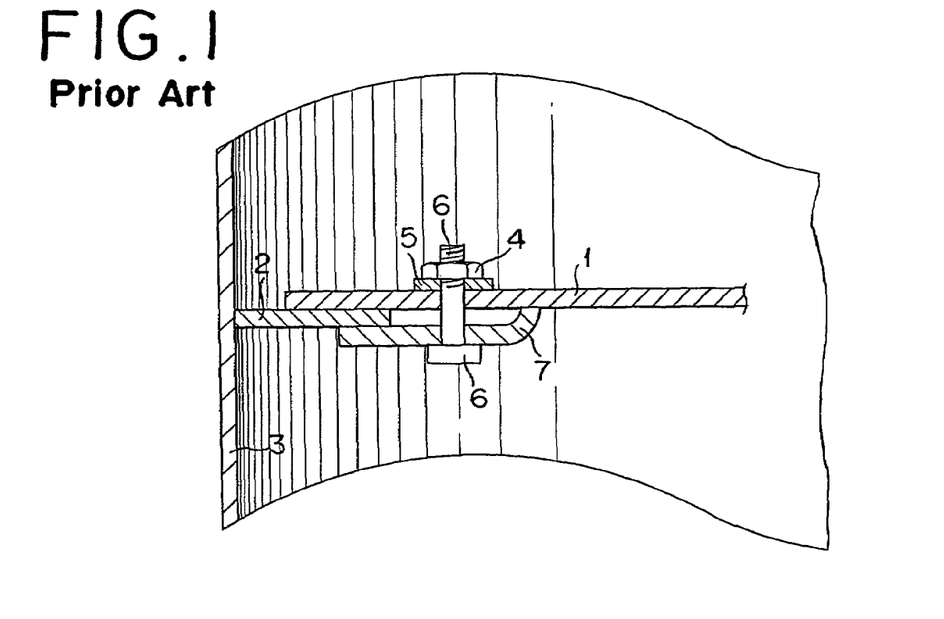
FIG. 1 is a partial cross section depicting the conventional method of fixing a tray to a support ring by a horizontal clamp.
Figure 2A:
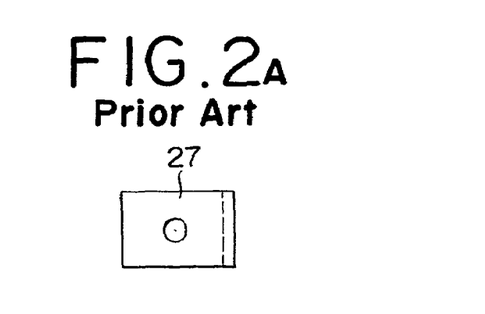
Figure 2B:
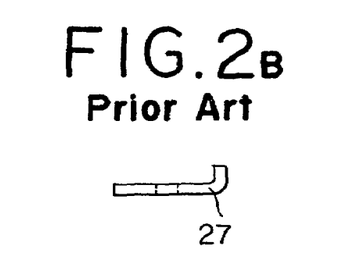
Figure 2C:
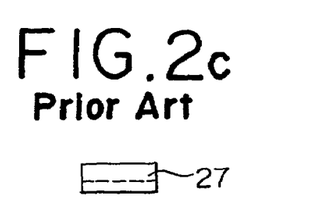

FIG. 1 is a diagram that depicts the conventional method for fixing a tray to a support ring by the use of horizontal clamps. In FIG. 1, a tray 1 is fixed to a support ring 2 with a horizontal clamp 7, washer 5, nut 4, and bolt 6. Incidentally, the support ring 2 is fixed to the inner wall 3 of a distillation column. FIG. 2 is a diagram for illustrating the horizontal clamp used in FIG. 1. FIG. 2A is a plan view of a horizontal clamp 27, FIG. 2B a front view thereof, and FIG. 2C a side view thereof. The term "horizontal clamp" as used herein, as is clear from FIG. 2A, refers to the width of the horizontal part of the clamp which exceeds 1.5 times the axial diameter of the bolt.

Figure 3:
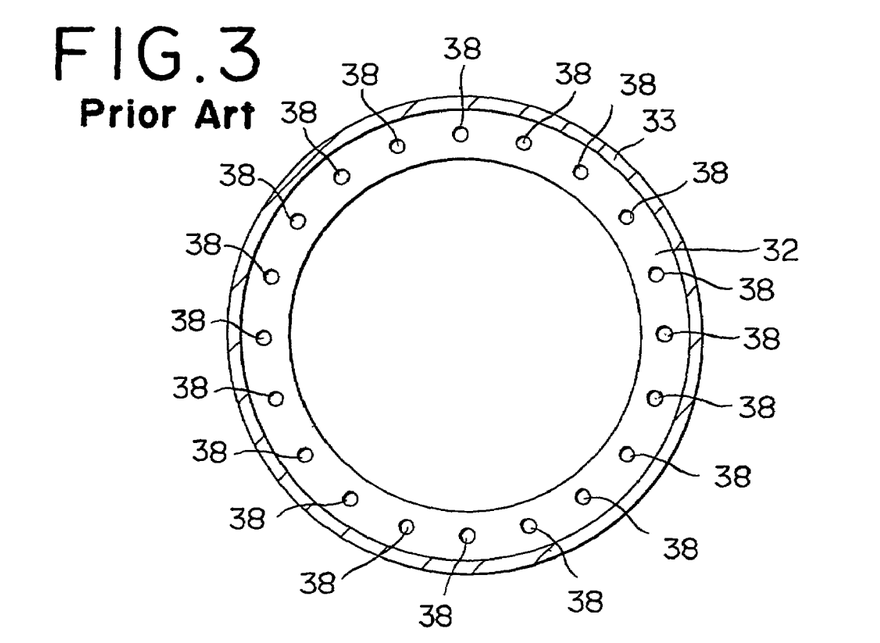
FIG. 3 is a diagram depicting the conventional liquid passing openings formed in a support ring fixed to the inner wall of a distillation column.

FIG. 3 is a diagram that depicts the conventional liquid passing openings formed in the support ring, which is fixed to the inner wall of the distillation column. With reference to FIG. 3 which is a diagram of the column as viewed from above, the liquid substance stagnating on a support ring 32 fixed to an inner wall 33 of the distillation column falls down via liquid passing openings 38.

According to this measure, the easily polymerizable organic compound is allowed to pass through the liquid passing openings, so that the stagnation can be lessened and the polymerization can be decreased to a certain extent. It, however, is not fully satisfied.

SUMMARY OF THE INVENTION

This invention is aimed at eliminating the problem mentioned above and, in effecting the purification of an easily polymerizable substance by the use of a distillation apparatus, aimed at providing a method for the production of an easily polymerizable substance which is capable of decreasing the polymerization thereof and a purification apparatus therefor.

An object of this invention is to provide a method for the production of an easily polymerizable substance, characterized by effecting necessary purification by the use of a column furnished in at least part thereof with (a) a tray directly fixed to a support ring by the use of a bolt and nut and/or (b) a tray fixed to a support ring by the use of a vertical clamp.

Another object of this invention is to provide a method for the production of an easily polymerizable substance, characterized by effecting necessary purification by the use of a distillation column provided in the lower part thereof with a splash collision plate.

Yet another object of this invention is to provide a purification apparatus, characterized by being provided with at least one of the following items (i)-(iii): (i) a tray fixed to a support ring by the use of a vertical clamp, (ii) at least one liquid passing opening formed in a joint part between a support ring and the wall of the column, and (iii) liquid passing openings formed in a fixing part between a tray and a support ring.

According to this invention, the retention time of a liquid substance can be shortened, so that the polymerization of an easily polymerizable substance in the distillation column can be repressed.

In accordance with this invention, by incorporating the splash collision plate in the distillation column, the polymerization of an easily polymerizable substance can be repressed in the interior of the distillation column by intercepting the splash from the liquid surface inside the column and preventing it from ascending further.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings:

FIG. 2 is a diagram illustrating the horizontal clamp used in FIG. 1; A is a plan view, B a front view, and C a side view respectively thereof;

FIG. 5 is a partial cross section illustrating one example of the fixation of a tray to a support ring by a bolt and nut; A is a front view, B a top view, and C a bottom view respectively thereof;

FIG. 7 is a partial cross section illustrating the horizontal clamp used in FIG. 6; A is a plan view, B a front view, and C a side view respectively thereof;

FIG. 11 is a partial cross section depicting the conventional manner of fixing a tray; A is a front view, B a top view, and C a bottom view respectively thereof.

DESCRIPTION OF THE PREFERRED EMBODIMENTS

Now, this invention will be described in detail below.

The easily polymerizable substance to be purified by this invention usually contains impurities. The purification performed for the removal of impurities is not particularly restricted so long as the substance of interest is an easily polymerizable liquid. Examples of the easily polymerizable substance may include unsaturated carboxylic acids and/or esters thereof, vinyl group-containing compounds, and diolefin compounds.

Examples of the unsaturated carboxylic acids may include acrylic acid and methacrylic acid {hereinafter referred to collectively as "(meth)acrylicacid".}, etc. Examples of the esters of unsaturated carboxylic acids may include alkyl (meth)acrylates, the alkyl having 1-8 carbon atoms, such as methyl (meth)acrylate, ethyl (meth)acrylate, butyl (meth)acrylate, and 2-ethylhexyl (meth)acrylate; hydroxyalkyl (meth)acrylates, the alkyl having 1-3 carbon atoms, such as hydroxyethyl (meth) acrylate and hydroxypropyl (meth) acrylate; dialkylamino (meth)acrylates, the dialkyl having 2-4 carbon atoms, such as dimethylaminoethyl (meth)acrylate and diethylaminoethyl (meth)acrylate; and glycidyl esters of (meth)acrylic acid. Examples of vinyl group-containing compounds may include acrylonitrile, styrene, and vinyl acetate. As concrete examples of diolefin compounds, butadiene, isoprene, and chloroprene may be cited. As preferred easily polymerizable substances, (meth)acrylic acid, methyl (meth)acrylate, ethyl (meth)acrylate, butyl (meth)acrylate and 2-ethylhexyl (meth)acrylate may be cited.

The term "purification" as used in this invention means the distillation, stripping, and absorption of the easily polymerizable substance mentioned above. The term "distillation" as used herein refers to the separation of the liquid mixture into the components thereof by utilizing the difference in vapor pressure among the components. Examples of the distillation may include simple distillation, multistage distillation, azeotropic distillation, and steam distillation. The term "stripping" refers to the operation of driving one or more components dissolved in a solution by forcing a gas not containing such components into contact with the solution. The term "absorption" refers to the operation of causing a solvent to absorb one or more components in a gaseous mixture.

The apparatus to be used for the purification or rectification of an easily polymerizable substance is not particularly restricted but only required to be capable of purifying the easily polymerizable substance. A distillation column may be cited, for example. Example of the distillation column may include a distillation column that has a plurality of trays, e.g. not less than three trays, preferably 3-100 trays, mounted internally in a multistage pattern.

The raw materials to be used in the purification are not restricted in concentrations as long as they contain easily polymerizable substance. For instance, the concentration may be not less than 60% by weight, preferably not less than 95% by weight, and especially not less than 98% by weight. In addition, the concentration in the distillate or a liquid drawn from the bottom is not restricted but depends on the purpose of purification.

The tray to be incorporated in this multistage distillation column is not restricted but may be any of those in popular use heretofore. Particularly from the viewpoint of preventing from polymerization, the trays are preferably formed of a dualflow tray. The opening area ratio of this porous plate is not subject to any restriction but only required to be in the range known to the art. Particularly from the viewpoint of facilitating the fall of an easily polymerizable substance through the openings of the plate and enabling the plate to retain necessary strength, the opening area ratio is preferably in the range of 10-60%.

Now, this invention will be described below with reference to the case of adopting acrylic acid as a representative of easily polymerizable substance and purifying this substance by distillation.

The acrylic acid is obtained by subjecting a raw material gas containing propylene, for example, to catalytic gas phase oxidation with a molecular oxygen-containing gas in the presence of an oxidation catalyst. The reaction product gas containing acrylic acid is introduced into an absorption column, cooled and condensed thereby obtaining it as an acrylic acid solution. This acrylic acid solution generally contains impurities such as acetic acid, propionic acid, maleic acid, acetone, acrolein, furfural, and formaldehyde. The acrylic acid solution thus obtained is deprived of low boiling substances having lower boiling points than acrylic acid in a low boiling substance separation column. The residue is introduced into a solvent separation column in which a crude acrylic acid is separated. The crude acrylic acid resulting from this separation is introduced into a distillation column in which acrylic acid is purified.

For the distillation, a multistage distillation column with a plurality of trays therein is generally utilized. These trays are fixed to the interior of the distillation column with tray supporting members.

Generally, the tray supporting members are each formed of a support ring fixed to the inner wall of the distillation column by bolting or welding, lugs fixed by bolting or welding to the inner wall of the distillation column below the relevant support ring for the purpose of reinforcing the ring of the support ring, and at least one support beam fixed by bolting or welding to the lugs for the purpose of reinforcing the tray when necessary. The support ring alone may be used as a tray-supporting member on the condition that it has strength enough to retain the tray. In using the clamps, usually a bolt and nut are used for fixing one clamp and pluralities of clamps are used for fixing one tray. In using a bolt and nut alone, pluralities of bolts and nuts are used for one tray.

It has been found that when liquid passing openings are provided in the joint part between the support ring and the inner wall of the distillation column, allowing a fluid to flow down the wall surface can prevent polymerization on the inner wall of the distillation column. The number of such liquid passing openings and the shape and size of each liquid passing opening can be arbitrarily selected so long as the support ring is capable of securing fully strength for supporting the tray. The number of the liquid passing openings can be selected so that the interval between the adjacent liquid passing openings is proper in the range of 10-500 mm, preferably in the range of 50-300 mm, and more preferably in the range of 100-200 mm. The shape may be arbitrarily selected from among semicircle, square, and triangle, for example. Generally, a semicircle or a triangle is used from the viewpoint of the ease of fabrication. The size is only required to be enough for quick descent of a liquid. In terms of the equivalent diameter represented by the formula:

Equivalent diameter=
4×(Cross-sectional area of opening)/(circumferential length of opening)

this size is selected generally in the range of 3-50 mm, preferably in the range of 5-30 mm, and more preferably in the range of 8-25 mm.

JP-A-10-212,249 discloses the method for preventing the polymerization due to the stagnation of a liquid on the support ring by forming liquid passing openings on the horizontal surface of such a tray supporting member as the support ring, for example. This method, however, has no effect on the polymerization that occurs on the wall surface of the distillation column.

The polymerization of a liquid substance can be repressed further by using a support ring provided with such liquid passing openings.

Further, the surfaces of the members including trays, tray supporting members, and an inner wall of the column are preferred to be such that their magnitudes of Ry (surface roughness) defined in JIS (Japanese Industrial Standard) B 0601 (-1994) are not more than 12.5, more favorably not more than 3.2. Treating their surfaces can attain the members of such surface roughness.

For the surface treatment of this sort, such mechanical polishing as buffing and electro polishing are available. The buffing is a method of polishing that is adopted when a flat smooth surface or a glossy surface is to be obtained. For the buffing, coarse polish with a stationary abrasive, a medium polish with a semisolid or free abrasive, and finish polish are available. For the buff abrasive, besides such soft materials as leather and cloth which are intended for polishing a surface, oily, non-oily, or spray solvents containing tripolysilicate, silicon carbide, fused alumina, calcined alumina, and chromium oxide as an abrasive can be used.

The electro polishing is a method for smoothing a metallic surface while melting it. As the electro polishing solution, which fits the materials made of iron or steel, perchloric acid type, sulfuric acid type, phosphoric acid type, sulfuric acid-phosphoric acid can be used. Since the iron and the steel have their texture largely varied not only with their compositions but also with the degrees of heat treatment and fabrication, they can be properly selected so as to suit the particular materials to be used. It, therefore, suffices to make this selection properly, depending on the amount of acetic anhydride to be added generally to a perchloric acid type electrolyte, the temperature of electrolysis, the density of electric current, the voltage, the duration of electrolysis, etc. Optionally, the materials may be subjected to mechanical polishing and further to electro polishing.

Now, this invention will be described below with reference to the accompanying drawings. In the drawings, like reference numerals stand for like members.

Figure 4:
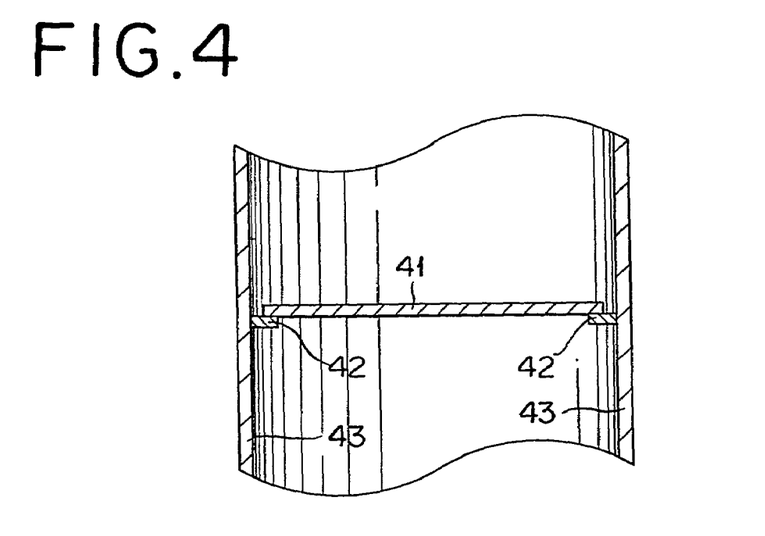
FIG. 4 is a partial cross section depicting one example of the support ring for supporting a tray that is mounted inside a distillation column.

FIG. 4 is a cross section that depicts one example of the support ring for supporting a tray seated inside a distillation column. In FIG. 4, a tray 41 is mounted on a support ring 42 fixed to an inner wall 43 of a distillation column by a known method such as bolting or welding. The support ring 42 can be used for this invention.

Figure 5A:
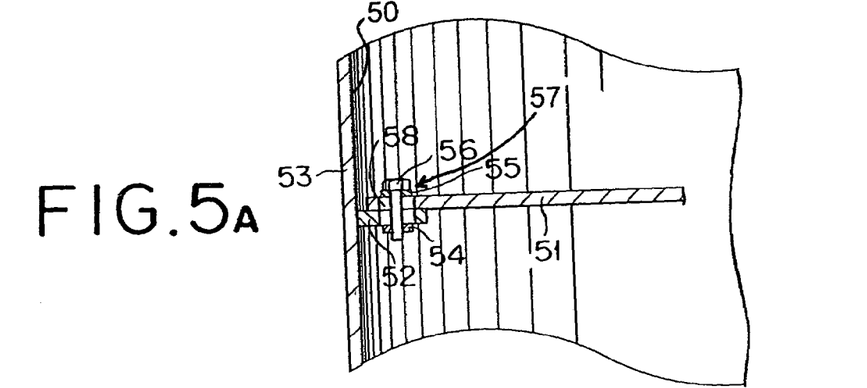
Figure 5B:
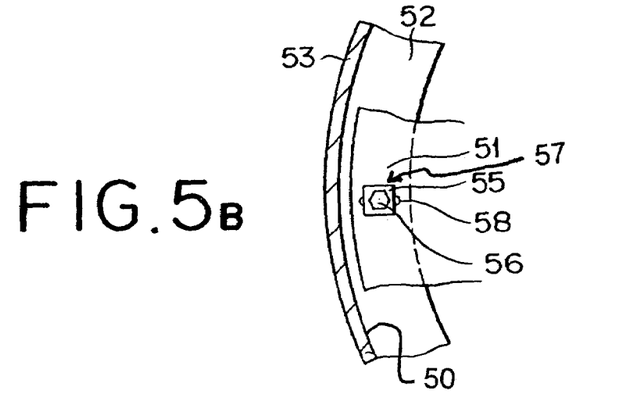
Figure 5C:
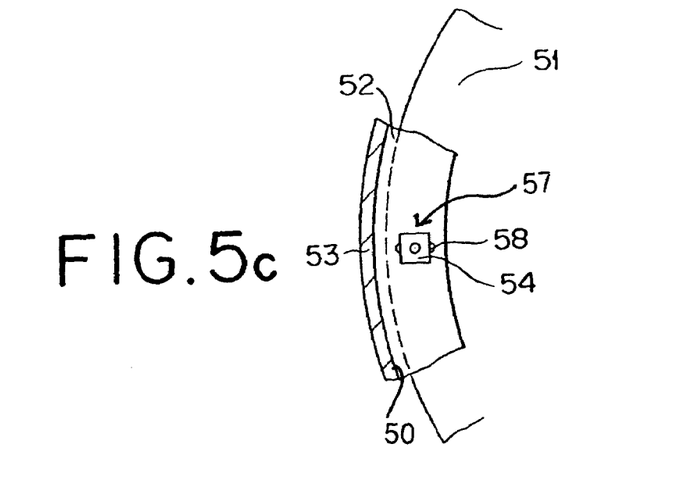

FIG. 5 is a diagram illustrating one example of the fixation of a tray to a support ring by a bolt 56 and nut 54. FIG. 5A is a partial cross section, FIG. 5B a diagram of FIG. 5A as viewed from above (the direction of the space embracing a bolt), and FIG. 5C a diagram of FIG. 5A as viewed from below (the direction of the space embracing a nut). In FIG. 5, a tray 51 is fixed by bolting to a support ring 52 through a washer 55. The support ring 52 is fixed to an inner wall 53 of a distillation column at joint part 5. Since the construction under discussion does not use a clamp as compared with the conventional manner, it gives virtually no point for inducing stagnation of a liquid in the part for fixing the tray to the support ring during the course of purification and consequently makes it possible to prevent an easily polymerizable substance from polymerization. The members used in this construction, therefore, are preferred to have the corners on the upper faces of the peripheral parts thereof cut and rounded and have the widths thereof decreased as much as the strength permits in order that the retention time of a liquid therein may be shortened to the fullest possible extent.

The numbers of the bolts and nuts for fixing the trays are not restricted as long as the tray is fully secured. For instance, the distance between adjacent holes for bolts and nuts may be in the range of 10 to 500 mm, preferably in the range of 50 to 300 mm, and especially in the range of 100 to 200 mm.

Further, in the conventional construction, since the gap between the bolt opening and the bolt is closed with a nut and washer, a liquid is liable to stagnate on the peripheries of the bolt to polymerize. It has been found that by elongating the bolt opening formed in both support ring and tray, as illustrated in FIG. 5, and minimizing the nut and the washer within the range in which they retain strength enough for fixing, it is possible to form liquid passing openings 58 in the bolt-nut part and allow effective prevention of the polymerization. The liquid passing openings mentioned above, similarly to the liquid passing openings formed in the joint parts between the support ring and the inner wall of the distillation column, preferably have a size such that the equivalent diameter is properly in the range of 3-50 mm, preferably in the range of 5-30 mm, and more preferably in the range of 8-25 mm. Generally, one tray is formed of a plurality of plates and these component plates are fixed mutually or to such a tray-supporting member as support ring or support beam with fixing part 57. The liquid passing openings mentioned above may be equipped in these fixing parts.

Figure 6:
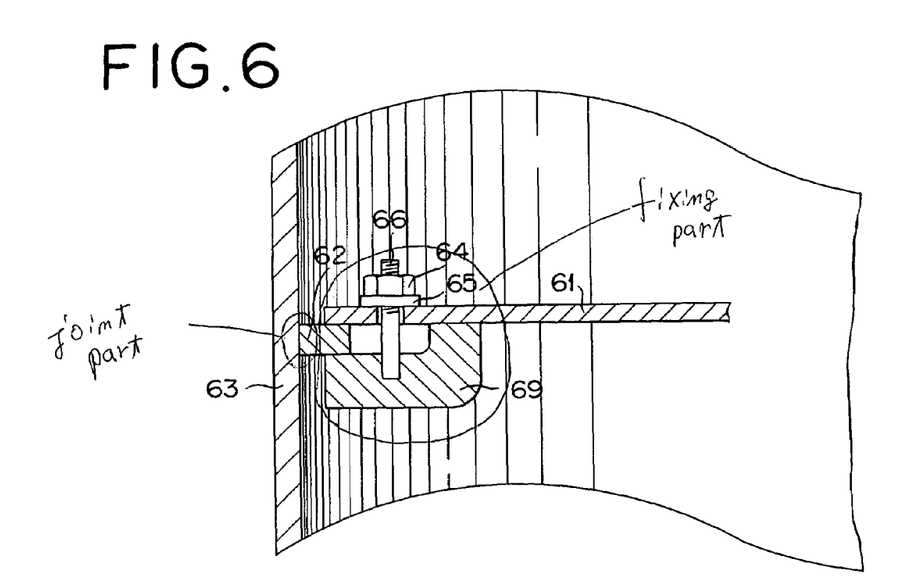
FIG. 6 is a diagram depicting one method for fixing a tray to a support ring by a vertical clamp.
Figure 7A:
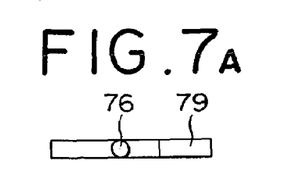
Figure 7B:
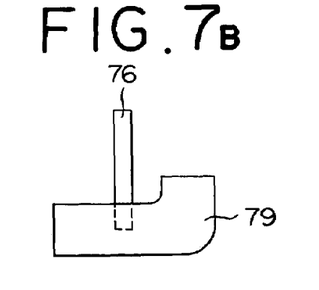
Figure 7C:
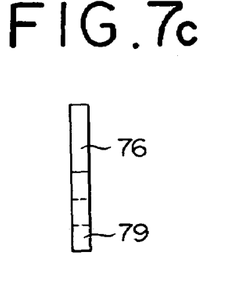

FIG. 6 is a diagram that depicts one method for fixing a tray to a support ring by a vertical clamp. In FIG. 6, a tray 61 is fixed with a vertical clamp 69, washer 65, nut 64, and bolt 66 to a support ring 62 fastened to an inner wall 63 of a distillation column. FIG. 7 is a diagram illustrating a vertical clamp 79 with a bolt 76 used in FIG. 6. FIG. 7A is a plan view of the vertical clamp 79, FIG. 7B a front view thereof, and FIG. 7C a side view thereof. As is clear from FIG. 7A, the term "vertical clamp 79" as used in this invention refers to a clamp whose width is equivalent to the diameter of a bolt (shank) 76. The term "equivalent" as used herein means that the width of the clamp is not less than 0.5 times and not more than 1.5 times the diameter of the bolt shank. The width of the clamp is preferred to be equal to or smaller than the diameter of the bolt shank for the sake of decreasing the part for stagnation of a liquid. Even if the easily polymerizable substance persists in a liquid state on the gap between the tray and the clamp during the course of purification, this construction allows the liquid to fall down, decrease the retention time of the liquid thereon, and consequently can prevent the substance from polymerization, since the width of the clamp becomes narrow compared to the conventional construction. Incidentally, since the vertical clamp has the width thereof narrowed so much as to equal roughly the width of the bolt for the purpose of shortening the retention time of a liquid substance thereon, the strength thereof decreases, but the strength of the clamp itself can be heightened by elongating the clamp height.

The numbers of the vertical clamps are not restricted as long as the tray is fully secured. For instance, the distance between adjacent vertical clamps may be in the range of 10 to 500 mm, preferably in the range of 50 to 300 mm, and especially in the range of 100 to 200 mm.

Figure 8:
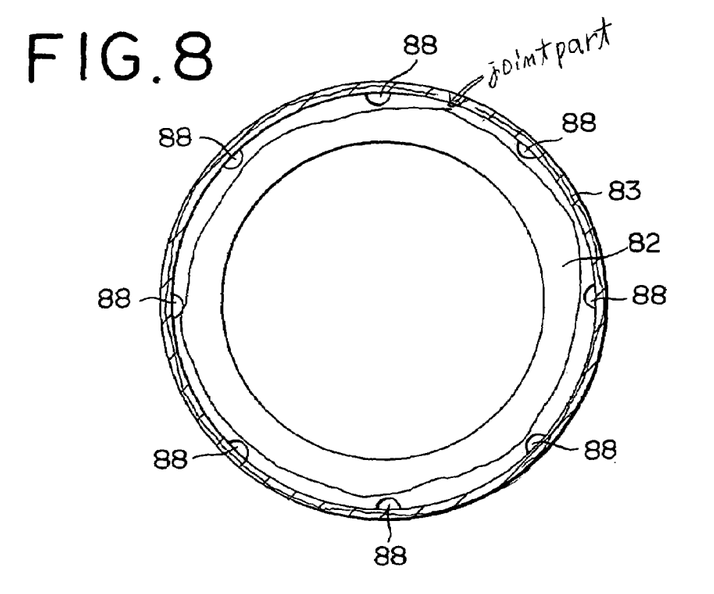
FIG. 8 is a diagram depicting liquid passing openings formed between the inner wall of a distillation column and a support ring fixed to the inner wall.

FIG. 8 is a diagram that depicts liquid passing openings formed between the inner wall of a distillation column and a support ring fixed to the inner wall. FIG. 8 illustrates the construction as viewed from above the column. The liquid substance, which has stagnated on a support ring 82 fixed to an inner wall 83 of the distillation column, falls down along the inner wall 83 via semcircular liquid passing openings 88.

Figure 9:
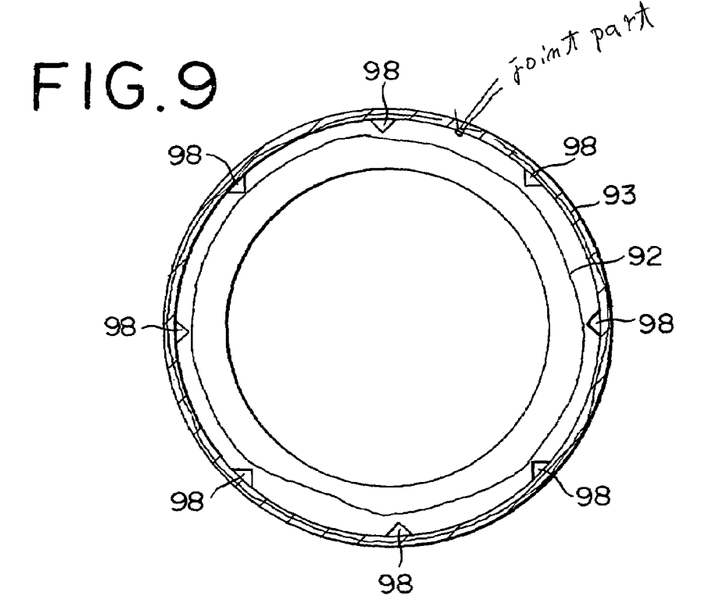
FIG. 9 is a diagram depicting other liquid passing openings formed between the inner wall of a distillation column and a support ring fixed to the inner wall.

FIG. 9 is a diagram that depicts other liquid passing openings formed between the inner wall of the distillation column and the support ring fixed to the inner wall. In FIG. 9 which illustrates the construction as viewed from above the column, the liquid substance which has stagnated on a support ring 92 fixed to an inner wall 93 of the distillation column falls down along the inner wall 93 via triangular liquid passing openings 98.

Figure 10A:
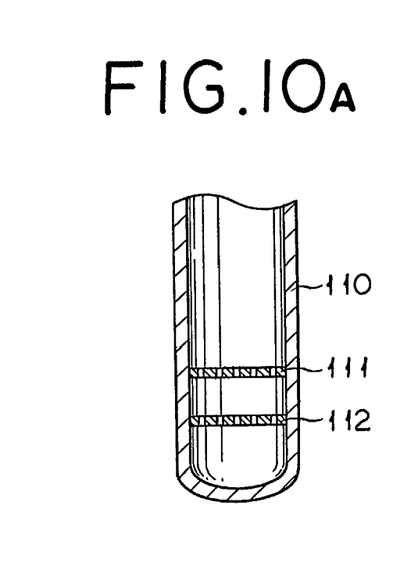
FIGS. 10A-10C are partial cross sections illustrating examples of the splash collision plates mounted on the lowermost part of distillation columns, respectively.
Figure 10B:
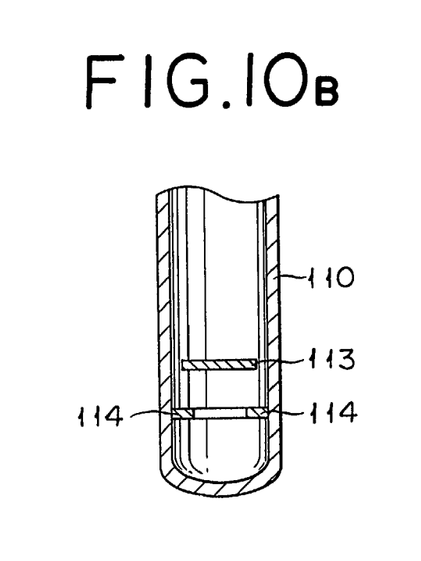
Figure 10C:
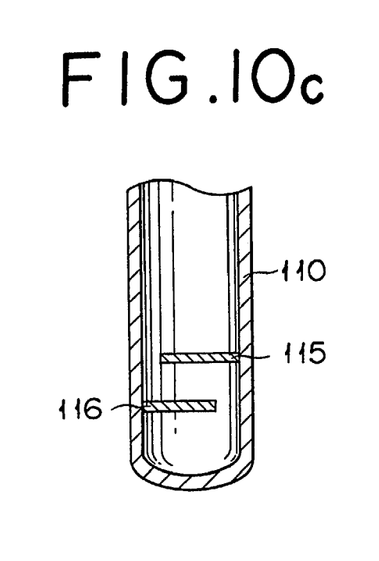

FIG. 10 is a diagram illustrating examples of the splash collision plates disposed on the lowermost parts of distillation columns. FIG. 10A illustrates an example using two dualflow trays 111 and 112, FIG. 10B two disc-and-doughnut type collision plates 113 and 114, and FIG. 10C two segmental baffle type collision plates 115 and 116. These trays may be fixed to the wall of the column in a conventional manner that it puts on a support equipped to the inner wall. Generally, splash collision plates such as dual flow trays are each formed of one to three component plates or as a pair. By providing a splash collision plate at the lowermost part inside a distillation column 110 as described above, it is possible to cut the liquid splashed from the liquid surface in the distillation column and prevent the polymerization on the trays disposed above the collision plate. When the dual flow tray is used as the splash collision plate, the opening area ratio of this tray is properly in the range of 30-70%, preferably in the range of 35-65%, and more preferably in the range of 40-60%. When a disc-and-doughnut type collision plate and/or a segmental baffle type collision plate is used, the surface of each collision plate has an arbitrary opening area ratio inclusive of 0, and the total opening area of the plate and the segmental opening is properly in the range of 10-90%, preferably in the range of 20-80%, and more preferably in the range of 30-70%, relative to the cross section of the column. The fixation of the splash collision plate to the inner wall of the distillation column may be attained by any of the known methods. The methods of fixations illustrated in FIG. 5 or FIG. 6 prove particularly advantageous from the viewpoint of preventing polymerization on the parts of fixation.

By properly combining the methods illustrated in FIGS. 4-10 described above, it is possible to attain further decrease of the polymerization of an easily polymerizable substance.

By combining the splash collision plate with the support ring having the liquid opening and the tray mentioned above, it is possible to repress the polymerization during the purification of an easily polymerizable substance.

EXAMPLES

This invention will be understood more readily with reference to the following examples. However, these examples are intended to illustrate the invention and are not to be construed to limit the scope of the invention.

Example 1

A distillation column measuring 1400 mm in diameter and equipped therein with 10 dualflow trays having the opening area ratio of 23%, respectively, was provided in the lower part thereof with two dualflow trays of opening area ratio of 40% as splash collision plates. Using the distillation column, the purification of acrylic acid was done under the conditions of 4000 kg/h of feed quantity (purity of acrylic acid: 95% by weight, supplied from the middle part of the column), 2500 kg/h of distillation quantity (distilled from the top part of the column), 2500 kg/h of reflux quantity (extracted from the top part of the column and supplied from the top part of the column), 1 kg/h of feed rate of hydroquionone monomethyl ether as a polymerization inhibitor to the reflux liquid, 10 kg/h of feed amount of oxygen to the bottom of the distillation column, 6.0 kPa abs of column top pressure, and 70° C. of column top temperature.

The dualflow tray was fixed, as illustrated in FIG. 5, by opening an oblong opening 20×40 mm in the tray and in the support ring welded to the wall of the column and fastening with a M10 (JIS) hexagonal bolt, a special square washer and special square nut measuring 50×20 mm, respectively, to the support ring and the tray in such a manner that the longer sides of the oblong opening and the longer sides of the washer and nut formed a roughly right angle. The number of the oblong opening was 20. 20 Segmental circular openings measuring 20 mm in radius were provided on the welding line between the support ring and the wall of the column. The apparatus thus constructed was continuously operated for two months and then brought to a stop. When the interior of the apparatus was visually inspected, the inner wall of the column, the upper sides of the trays, and the tray-fixing parts showed no sign of adhesion of a polymer. Though dirt originating in a polymer was observed on the rear side of the lowermost dualflow tray having an opening area ratio of 40%, abnormality such as blockage of openings, which would affect the operation of the distillation column, was not detected.

Example 2

The purification of acrylic acid was performed by using the same apparatus and the same conditions as in Example 1 while using vertical clamps, as illustrated in FIG. 6, in fixing the trays to the support rings.

The apparatus was continuously operated for two months and then brought to a stop. When the interior of the apparatus was visually inspected, the adhesion of a polymer to the gaps between the vertical clamps and the trays was observed and the polymer apparently fallen from the clamps accumulated on the outer peripheral parts of the trays underlying the clamps. The amount of the polymer so accumulated was about 3 kg per stage. The operating conditions were not confused during the two months' continuous operation in spite of this accumulation of the polymer.

COMPARATIVE EXAMPLE 1

The purification of acrylic acid was performed by using the same apparatus and the same conditions as in Example 1 while using horizontal clamps, as illustrated in FIG. 1, in fixing the trays to the support rings.

The apparatus was set operating as aimed at two months' continuous operation. From the start of the operation, the pressure in the lower part of the distillation column was observed to rise with the elapse of time. Thus, the apparatus was stopped after one month's operation. When the interior thereof was visually inspected, the adhesion of a polymer to the gaps between the horizontal clamps and the trays was observed and the polymer apparently fallen from the clamps accumulated on the outer peripheral parts of the trays underlying the clamps. The amount of the polymer so accumulated was about 50 kg per stage. The accumulated polymer was clearly observed to initiate further advance of polymerization on the trays.

COMPARATIVE EXAMPLE 2

Figure 11A:
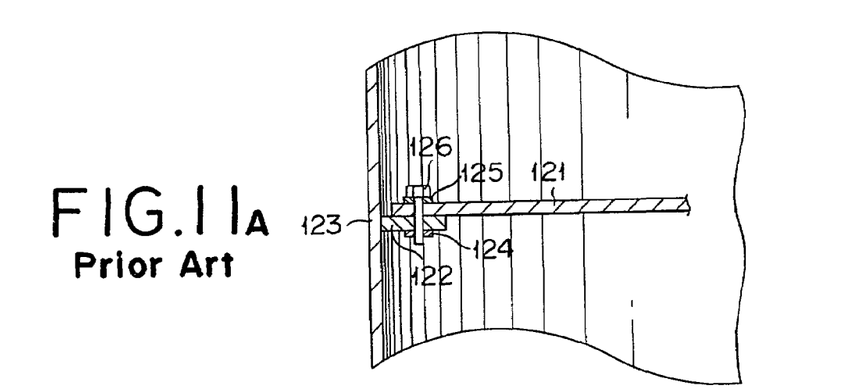
Figure 11B:
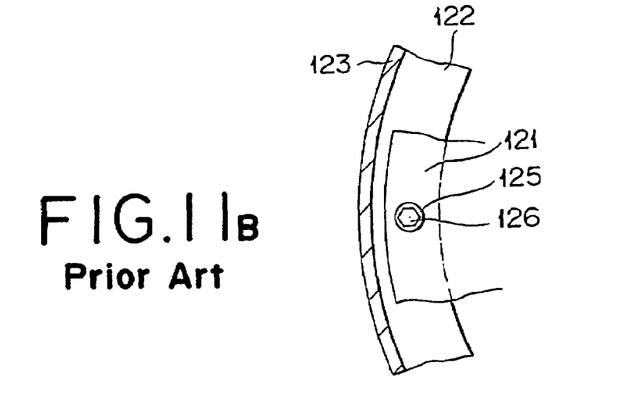
Figure 11C:
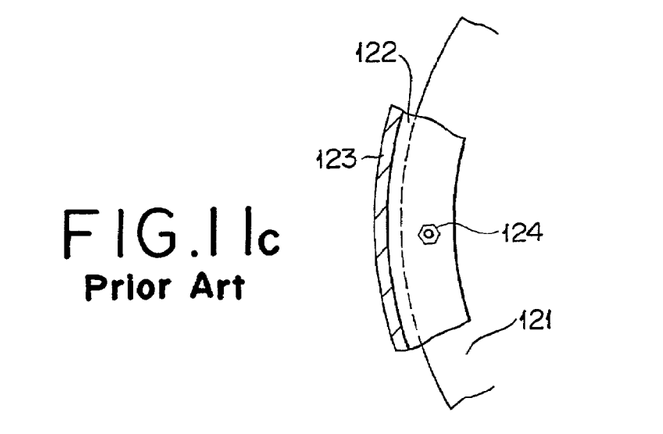

The purification of acrylic acid was performed by using the same apparatus and the same conditions as in Example 1 while eliminating the liquid passing openings on the welding line between the support ring and the wall of the column, and fixing the trays as illustrated in FIG. 11. FIG. 11 is a diagram depicting the manner of fixing trays; FIG. 11A representing a partial cross section, FIG. 11B a diagram illustrating FIG. 11A as viewed from above (the direction of the space embracing bolts), and FIG. 11C a view illustrating FIG. 11A as viewed from below (the direction of the space embracing nuts). In FIG. 11, openings 11 mm in inside diameter were opened as bolt openings in a support ring 122 and a tray 121 and fixing the support ring 122 and the tray 121 with a M10 (JIS) hexagonal bolt 126 and hexagonal nut 126 and washer 125.

The apparatus was set operating as aimed at two months' continuous operation. From the start of the operation, the pressure in the lower part of the distillation column was observed to rise with the elapse of time. Thus, the apparatus was stopped after one month's operation. When the interior thereof was visually inspected, the adhesion of a polymer to the wall of the column and the tray-fixing bolt was observed and the accumulation of polymer on the outer peripheral parts of the trays was also observed. The amount of the polymer so accumulated was about 10 kg per stage.

COMPARATIVE EXAMPLE 3

The purification of acrylic acid was performed by using the same apparatus and the same conditions as in Example 1 while dismounting the two dualflow trays having an opening area ratio of 40%.

The apparatus was set operating as aimed at two months continuous operation. From the start of the operation, the pressure in the lower part of the distillation column was observed to rise with the elapse of time. Thus, the apparatus was stopped after one month's operation. When the interior thereof was visually inspected, the adhesion of a polymer to the rear side of the lowermost dualflow tray having an opening area ratio of 23% was observed and the polymer was found to block about 5% of the opening area.

The entire disclosure of Japanese Patent Application No. 2000-114305 filed on Apr. 14, 2000 including specification, claims, drawings and summary are incorporated herein by reference in its entirety.

What is claimed is:

1. A method for the purification of an easily polymerizable substance, comprising the step of using a distillation column provided in at least part thereof with (a) a tray fixed with a bolt and a nut to a support ring fitted to the inner wall of the column or (b) a tray fixed to a support ring fitted to the inner wall with a vertical clamp and provided in the lower part thereof with a splash collision;
   wherein at least one liquid passing opening is provided to a joint part between said support ring and the inner wall of said column and said tray is a dualflow tray and said splash collision plate having an opening area ratio of said tray in the range of 30% to 70% or a splash collision plate being a disc-and-doughnut type collision plate and/or a segment baffle type collision plate having a total opening area of said collision plate and a segmental opening in the range of 10% to 90% relative to a cross section of the column.

2. A method according to claim 1 further comprising a liquid passing opening provided to a fixing part between said tray and said support ring and/or, where one tray is formed of a plurality of component plates, a fixing part between each of the component plates and the plate of tray.

3. A method according to claim 1, wherein said distillation column comprises a plurality of trays.

4. A method according to claim 3, wherein said distillation column has 3 to 100 of said trays.

5. A method according to claim 1, wherein said easily polymerizable substance is at least one member selected from the group consisting of an unsaturated carboxylic acid, an ester thereof, a vinyl-group containing compound, and a diolefin compound.

6. A method according to claim 5, wherein said easily polymerizable substance is at least one member selected from the group consisting of an unsaturated carboxylic acid and an ester thereof.

7. A purification apparatus comprising a splash collision plate in the lower part of the distillation column, said splash collision plate being a dualflow tray having an opening area ratio of said tray in the range of 30% to 70% or a splash collision plate being a disc-and-doughnut type collision blate and/or a segment baffle type collision plate having a total opening area of said collision elate and a segmental opening in the range of 10% to 90% relative to a cross section of the column: and at least one of the following items (i)-(iii);
   (i) a tray fixed to a support ring, fitted to the inner wall of a distillation column, by the use of a vertical clamp.
   (ii) at least one liquid passing opening provided in a joint part between said support ring and the wall of said column, and
   (iii) a liquid passing opening provided in a fixing part between said tray and said support ring.

8. An apparatus according to claim 7 further comprising 3 to 100 trays therein.

9. An apparatus according to claim 7, the distillation column is used for purifying an easily polymerizable substance.

10. An apparatus according to claim 7 further comprising a liquid passing opening provided to the fixing part between said tray and said support ring and/or, where one tray is formed of a plurality of component plates, the fixing part between each of the component plates and the plate of tray.

* * * * *